United States Patent
Benraz

(10) Patent No.: US 10,234,870 B2
(45) Date of Patent: Mar. 19, 2019

(54) AUTONOMOUS PUBLIC TRANSPORTATION SYSTEM

(71) Applicant: Yosef Benraz, Herzliya (IL)

(72) Inventor: Yosef Benraz, Herzliya (IL)

( * ) Notice: Subject to any disclaimer, the term of this patent is extended or adjusted under 35 U.S.C. 154(b) by 131 days.

(21) Appl. No.: 15/458,042

(22) Filed: Mar. 14, 2017

(65) Prior Publication Data
US 2018/0059688 A1 Mar. 1, 2018

Related U.S. Application Data

(60) Provisional application No. 62/308,030, filed on Mar. 14, 2016.

(51) Int. Cl.
| | |
|---|---|
| *G05D 1/02* | (2006.01) |
| *G05D 1/00* | (2006.01) |
| *G08G 1/00* | (2006.01) |
| *G06Q 50/30* | (2012.01) |

(52) U.S. Cl.
CPC ......... *G05D 1/0291* (2013.01); *G05D 1/0088* (2013.01); *G06Q 50/30* (2013.01); *G08G 1/202* (2013.01); *B60W 2300/10* (2013.01); *G05D 2201/0212* (2013.01); *G05D 2201/0213* (2013.01)

(58) Field of Classification Search
CPC ............... G05D 1/0291; G05D 1/0088; G05D 2201/0212; G05D 2201/0213; G06Q 50/30; G08G 1/202; B60W 2300/10
See application file for complete search history.

(56) References Cited

U.S. PATENT DOCUMENTS

2010/0044998 A1\* 2/2010 Franchineau ............ B60D 1/36
280/491.1

\* cited by examiner

*Primary Examiner* — Mary Cheung
(74) *Attorney, Agent, or Firm* — Edward Langer Adv & Patent Attorney

(57) ABSTRACT

Disclosed are systems and methods for providing separable vehicles from a main vehicle to pick up or drop off passengers and return and reconnect to the main vehicle.

9 Claims, 7 Drawing Sheets

AUTONOMOUS PUBLIC TRANSPORTATION SYSTEM

CROSS-REFERENCE TO RELATED APPLICATIONS

This application is related to and claims priority from commonly owned U.S. Provisional Patent Application Ser. No. 62/308,030, entitled: AUTONOMIC PUBLIC TRANSPORTATION SYSTEM, filed on Mar. 14, 2016, the disclosure of which is incorporated by reference in its entirety herein.

FIELD OF THE INVENTION

The present invention relates generally to providing an autonomous public transportation.

BACKGROUND OF THE INVENTION

Existing public transportation typically involves bus travel along predetermined routs, picking up passengers at predetermined locations or stops. At the predetermined stops, passengers typically must wait for the bus. These passengers can only get on or off the bus at these predetermined stops. This holds true regardless of weather, street conditions or the time of day or night. The entire concept of public transportation where busses take pre-determine routes with predefined stops has existed since the beginnings of public transportation. This approach is inefficient, and inconvenient for passengers, especially when the weather is bad. Also, busses sometimes have to change routes unexpectedly, when there are accidents, road construction, fires and other conditions, which may not be known to riders, causing them to waste time waiting for a bus that will not arrive, or not stop where expected.

SUMMARY OF THE PRESENT INVENTION

The present invention changes the existing approach of public transportation by providing autonomous bus stations to solve the problems associated with contemporary bus routes of public transit systems. The invention allows passengers to get on and get off the bus without having to wait at the pre-determined stops. Additionally, the bus can take alternative routes, to accommodate for accidents and other temporary conditions, and riders will be on the bus heading to their destination.

Throughout this document, a "bus" refers to any public bus or other public transportation vehicle, controlled by a driver, semi-automatically, or completely without a driver or operator.

In this document, the term "Autonomous car" refers to an autonomous car or other vehicle which may serve as a single vehicle or an autonomous "bus station." The car is capable of self-driving, automatically, to take passengers from one location to another, for example, to the bus from their home or other designated location, or from the bus to their home or other designated location. These autonomous cars have the ability to attach and detach to and from a bus to enable passengers to enter the bus directly from the autonomous car, and vice versa, without exposure to the outside environment.

Embodiments of the invention are directed to systems and methods for providing a new approach for public transportation by bus/autonomous bus/semi-automatic driving bus, train, ship airplane and a moving station by self-driving "bus station" that attach and detach to a bus and/or self-driving bus, to load and unload passengers to and from the bus to and from one bus to another.

Embodiments of the present invention provide a systems and methods where autonomous cars function as autonomous bus stations to pick passengers from their locations, and transport them to a bus, instead of the passenger waiting for the bus at a pre-determined static bus station. Some embodiments of the present invention may associate to the ability of the autonomous car to attach and detach to and from a bus, which may be an autonomous/self-driving bus, to load and unload passengers.

In some embodiments, the loading and unloading of passengers may done without the passenger have to leave his seat, for example, the seat automatically moves between the autonomous car to the bus, and vice versa, which in some embodiments of the present invention, the bus may provide the autonomous car with an empty seat replacement. This enables the autonomous car to go and pick another passenger, for this bus or another bus. In certain embodiments, the same autonomous car that has just unload a passenger and while it attached a bus, may pick another passenger from the same bus to move the passenger to his desired destination or to another bus.

Some embodiments of the present invention may include a system that communicates and manages an entire fleet of autonomous cars and busses, so as to be synchronized with each other, and/or with the passengers, in order to coordinate the time and/or location to pick the passenger, a time and/or location of loading and/or unloading of passengers to and from a bus, which in some embodiments of the present invention may coordinate moving a passenger from one bus to another.

Embodiments of the present invention may provide systems and methods for monitoring the autonomous cars locations, and or other information such as moving and non-moving locations for the autonomous car, passenger occupancy in each autonomous car, and status of attachment/detachment with respect to a bus. Monitoring the busses, based on location, speed, amount of available seats, current path, and destination, is also performed.

Some embodiments of the present invention may include systems and methods for communicating and/or informing the bus about an autonomous car requesting attachment, for example to move the bus to enter an attaching mode or detaching from an autonomous car, for example to load and or unload a passenger.

Some embodiments of the present invention may include systems and methods for informing the bus about with information, for example regarding the path, which may be slowed or altered by traffic and or accidents along the bus route. Based on the information received, the bus can alter or change its route to temporarily accommodate the changed condition, e.g., traffic accident, increased traffic and the like.

Embodiments of the invention are directed to a method for transport. The method comprises: providing a single vehicle including a primary vehicle and a secondary vehicle separable from the primary vehicle; separating the secondary vehicle from the primary vehicle, allowing the secondary vehicle to travel along a route different from the route of the primary vehicle to pick up or drop off passengers; and, the secondary vehicle rejoining the primary vehicle as the single vehicle, for loading and unloading passengers to and from the primary vehicle, while the single vehicle travels along the route of the primary vehicle.

Optionally, the secondary vehicle includes an autonomous bus station which allows passengers to get on and get off the autonomous bus station.

Optionally, the primary vehicle changes routes, to accommodate changes in road conditions.

Optionally, the primary vehicle includes a vehicle, controlled by at least one of: a driver, semi-automatically, or autonomously.

Optionally, the secondary vehicle includes a vehicle, controlled by at least one of: a driver, semi-automatically, or autonomously.

Optionally, the loading and unloading of passengers is performed by a seat which automatically moves between the primary and secondary vehicles.

Optionally, the secondary vehicle moves passengers between two or more primary vehicles.

Optionally, the method additionally comprises: coordinating communication between the primary vehicle and the secondary vehicle, and passenger, such that a time and location of a secondary vehicle to attach to a primary vehicle to load and or unload a passenger is determined.

Optionally, the attaching and detaching between the primary vehicle and the secondary vehicle is performed automatically.

Embodiments of the invention are directed to a method for combining vehicles into single units. The method comprises: moving at least two vehicles, for example, automobiles, trucks, or the like, into proximity with each other to connect the at least two vehicles into a single vehicle for traveling along a predetermined route as a single vehicle.

Optionally, the at least two vehicles include connectors configured for engagement of the vehicles.

Embodiments of the invention are directed to a method for combining at least two vehicles comprising: moving at least two vehicles into proximity with each other, such that at a predetermined distance between the at least two vehicles, battery energy is communicated between the at least two vehicles.

Optionally, the battery energy communicated between the at least two vehicles is at least one of shared between the at least two vehicles or used for charging the battery of one of the vehicles.

Optionally, the communication between the vehicles is through a connector between the vehicles. vehicles have an ability to charge each other, via a connector in front and or back of the vehicle, which enables vehicles to connect to each other and exchange and or share battery charge (energy) or charge the weaker battery.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DETAILED DESCRIPTION OF EMBODIMENTS OF THE PRESENT INVENTION

Figure 1:
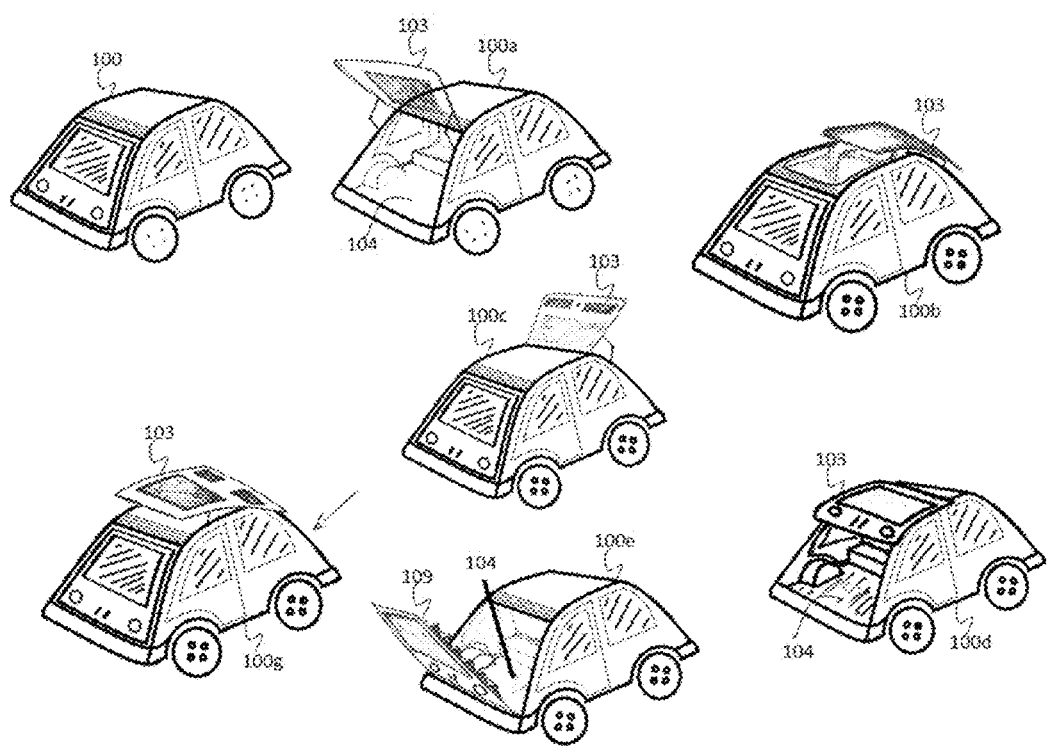
FIG. 1 is a schematic illustration different alternatives to an autonomous cars according to some embodiments of the present invention.

In the following detailed description, numerous specific examples are set forth in order to provide a thorough understanding of the invention. However, it will be understood by those of ordinary skill in the art that the present invention may be practiced without these specific examples. In other instances, well-known methods, procedures, components, and circuits have not been described in detail so as not to obscure the present invention. For example, a database may be used, however, its structure and relationships are not described in detail as it is understood by those of ordinary skill in the art that a database may be used in any number of ways to store and retrieve information to implement various embodiments of the present invention.

Systems and methods according to embodiments of the present invention may provide a connection between a passenger's device and the system to enable a passenger to request a ride from his or an alternative location to a desire destination, the system may inform the passenger about the exact and or estimation time when the autonomous car may arrive to pick him up.

Further, systems and methods according to embodiments of the present invention may enable to determine the optimal time and location of the autonomous car to attach to a bus to load and or unload a passenger. According to certain embodiments, if the bus changes its route, for example, to accommodate a situation, such as a traffic accident, construction, street closure, the systems and methods described herein may inform the autonomous car about the changed location of the bus, in order to attach or detach from the bus.

In some embodiments of the present invention the autonomous car itself may determine the location and or the path to attach to the bus to avoid overload the system. More specifically, embodiments of the present invention provide the autonomous cars with independent navigation systems, and make decisions for navigating to optimum locations to meet the bus and attach thereto, for example, by using sensors that may be integrated or installed in the autonomous car such as GPS, MAPS, and NAVIGATION systems. The system also allows all busses and autonomous cars to be connected vehicles, in direct communication with each other, for example, via wireless communication links.

To provide an accurate autonomous public transportation, certain embodiments of the present invention may request to have the current location of each autonomous car, bus, the status of each bus and autonomous car such as in the move, have a passenger, what is the autonomous car destination, whither taking a passenger to a bus, or to the passenger destination, or to pick a passenger from passenger's location or from a bus, and the like.

Additionally, the system may gathering additional data or information from different sources such as traffic systems, maps providers about latest up to date maps, traffic changes and plans such as blocking roads during a US president visit, sport event such as marathon etc. In certain embedment of the present invention, the system may inform the bus(es) and the autonomous car(s) about relevant information and or data that may be used by the bus and or the autonomous car 100, for example, to determine changes according to the data been collected and or analyzed.

According to certain embodiments, data may be stored locally in a bus, train, ship, airplane and or the autonomous car, and or in a centralize data base which provide access directly or indirect to the autonomous car and or the bus, train, ship and airplane. In certain embodiments, autonomous car and or bus may gather data themselves and may share with the system to be use by other autonomous car and or bus, for example when an accident occur in the autonomous cars' or buss' path.

Reference is now made to FIG. 1, which is a schematic illustration of an autonomous car 100. This autonomous car 100 is designed for moving passengers from one location to a bus and vice versa, from one bus to another bus. The autonomous car 100 is designed, to enable attachment and detachment for a bus, and typically is of correspondingly configured shapes and dimensions to attach to the bus, such that the autonomous car 100, while attached to the bus functions as part of the bus. Additionally, the autonomous car 100 may have a self-driving capability according to some embodiments of the present invention. Autonomous cars 100*a*, 100*b*, 100*c*, 100*d*, 100*g* and 100*d* are similar to autonomous car 100, but include various doors (ingress/egress structure) 103, door attachments, such as stairs 109, and passenger zones 104 for safely accommodating passengers. While these configurations for autonomous cars 100, 100*a*, 100*b*, 100*c*, 100*d*, 100*g*, are shown, other configurations are also possible. The autonomous car 100 (representative of autonomous cars 100*a*, 100*b*, 100*c*, 100*d* and 100*g*) may include a computerized system 190 (FIG. 6), and other parts such as engines and additional sensors that are not shown, since they are basic features of all cars.

Passenger zone 104 may have many applications and may have different designs. However, all of these designs are to safely accommodate passengers during their transit as well as entering and exiting the autonomous car 100. In some embodiments of the present invention, when the autonomous car has been attached to the bus, the Loading Door 103 may open automatically or manually to enable safely loading and or unload a passenger to and/or from the bus.

Figure 2:
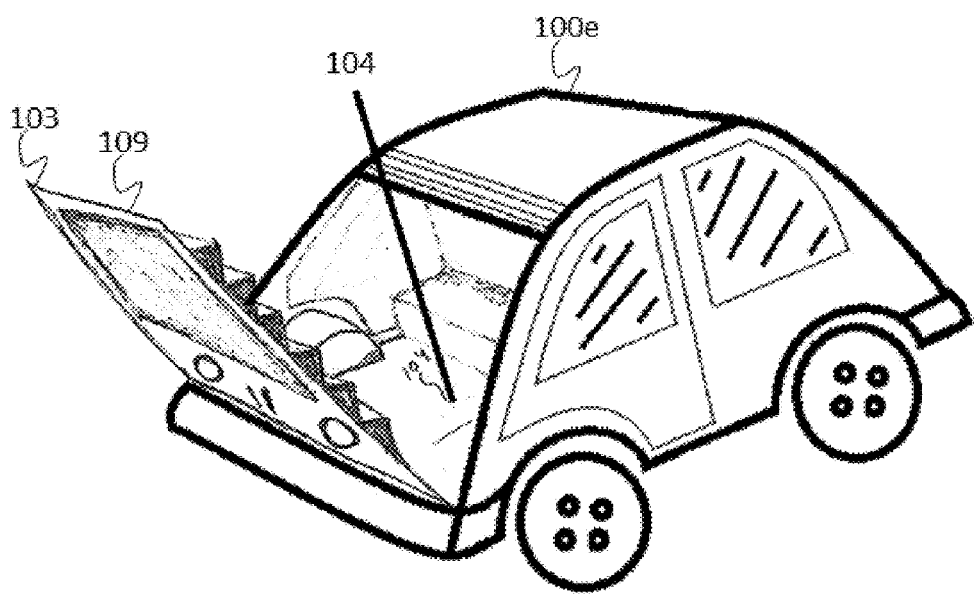
FIG. 2 is a schematic illustration one alternative to an autonomous car according to some embodiments of the present invention.

Reference is now made to FIG. 2, which is a schematic illustration of one additional design of the autonomous car 100*e*. For this autonomous car 100*e*, there is a stair 109, which enables passengers to walk in and out the bus conveniently. The stair 109 may be part of the autonomous car, or may be part of the bus which may go down automatically, once the autonomous car 100 has successfully attached to the bus and the loading door 103 is opened according to some embodiments of the present invention. The autonomous car, and particularly the passenger zone 104, is, for example, at the same height, as the passenger area of the bus 200, allowing for easy movement of passengers between the autonomous cars 100 and the bus 200.

Figure 3:
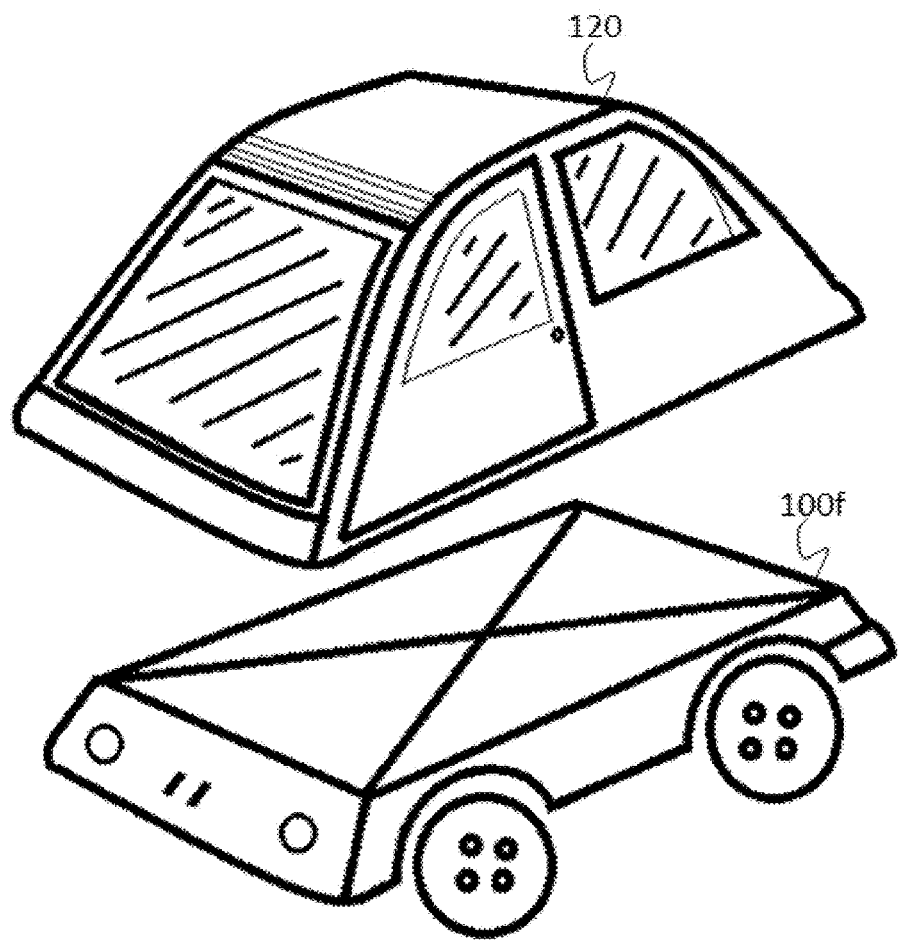
FIG. 3 is a schematic illustration another alternative to an autonomous car according to some embodiments of the present invention.

Reference is now made to FIG. 3, which is a schematic illustration of an autonomous car 100, where the passenger compartment 120, which includes the Passenger Zone 104, is completely detachable from the autonomous car 100, at its base 100*f*. This allows use of the autonomous cars with other vehicles, such as trains, airplanes, ships, and the like, as an alternative to a bus 200. Here, a passenger, for example, may travel from one location in San Francisco to another location in New York without any need to walk or touch the ground. In alternate embodiments, the passenger compartment 120 includes a bed, bathroom, and or restroom and or anything could enable the passenger stay in the autonomous car 100, without the need to leave the Passenger Room 120 for long times. The passenger may still able to leave the Passenger Room 120 during the traveling time, for example to walk around the train and or ship and or airplane, meet other passengers, for example, in a public area, inside, for example, an airplane, etc.

In some embedment of the present invention, the autonomous car 100*f* may attached to another Passenger Room 120 with a passenger inside to take the passenger to its destination directly or through a bus, train, ship or airplane, additionally or alternatively the autonomous car 100*f* may attach to an another empty Passenger Room 120 to be able to go and pick a passenger from a location, a bus, train, ship or airplane.

Figure 4:
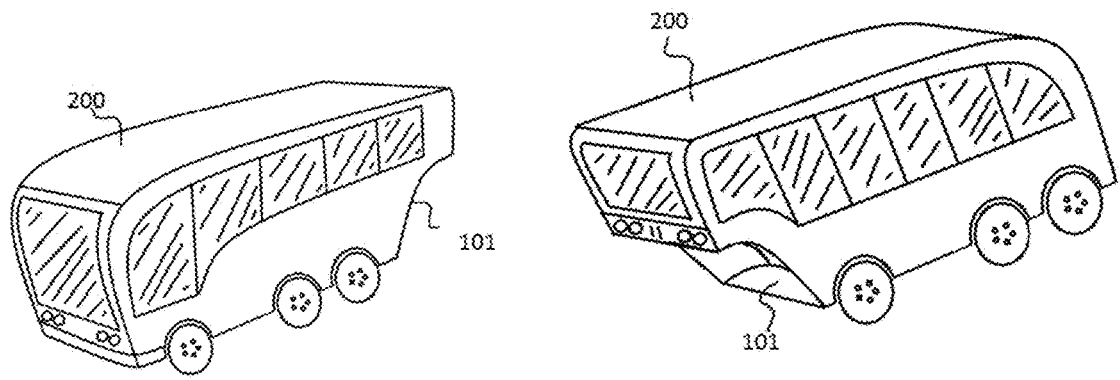
FIG. 4 is a schematic illustration two different alternatives to a bus and or an autonomous bus according to some embodiments of the present invention.

Reference is now made to FIG. 4, which is a schematic illustration of a bus 200 which may build or design to enable attach and detach with an autonomous car 100. Bus 200*a* and 200*b* are only for illustration purpose and may designed totally differently in shapes and or design according to embodiments of the present invention. Bus 200 may include an attachment zone 101, which is correspondingly configured to a portion of an autonomous car 100, so as to attach in an ergonomic manner, as shown, for example, in FIG. 5. This attachment enables passengers to get on and or get off the bus. As mentioned above, in some embodiments of the present invention the system may interact with a train, ship and airplane instead of a bus, where the autonomous car may attach or detach to load and unload passengers. Additionally or alternatively the autonomous car 100 may partly as described in reference to FIG. 3, or completely loaded on a train, ship and airplane according to some embedment of the present invention.

Figure 5:
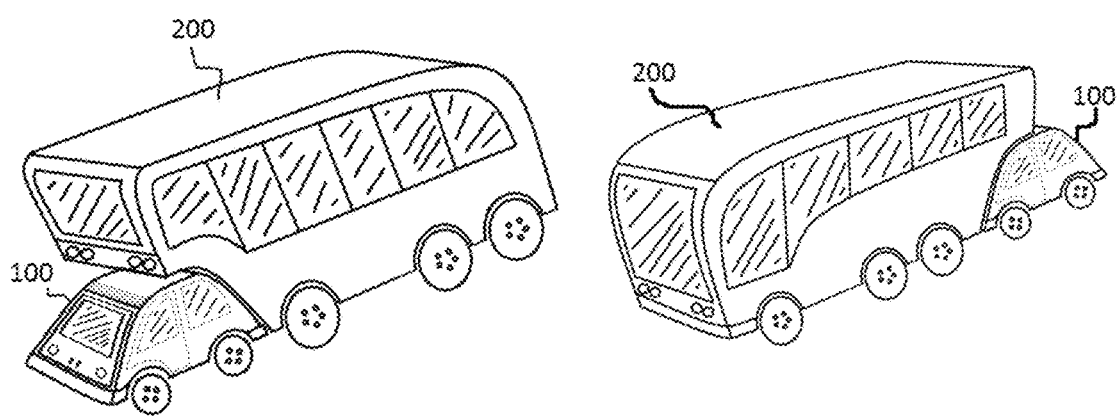
FIG. 5 is a schematic illustration of the attached between the autonomous car and a bus to load and or unload passenger(s) according to some embodiments of the present invention.

Reference is now made to FIG. 5, which is a schematic illustration that illustrate an attach between an autonomous car 100 and a bus 200 where the autonomous car 100 attached to the Attach Zone 101 according to some embodiments of the present invention. Alternatively, the autonomous car 100 may automatically or manually open the Loading Door 103 to enable the passenger get on and or get off the bus. Additionally or alternatively, stairs or a flat surface 109 may appear to enable the passenger to walk on safely. These stairs or flat surface may be part of the Loading Door 103 of the autonomous car 100, or alternatively be part of the bus 200.

Methods of the invention are such that the autonomous car 100 connects safely and easily to a bus 200. For example, this connection may be synchronized between the autonomous car 100 and the bus 200, directly or through a backend server 500 (FIG. 6), which is detailed below. For example, the autonomous car 100 may know the exact speed and path of the bus 200, and can connect while both the car 100 and the bus 200 are moving. Alternatively, after the attachment between the autonomous car 100 and the bus 200 is accomplished, the Loading Door 103 may open, the stairs or flatting surface 109 may appear, and the passenger may get off or get on the bus 200.

When the autonomous car 100 initiates detachment, the stairs or flatting surface 109 disappear, the Loading Door 103 closes and the autonomous car 100 moves away from the bus 200.

Additionally or alternatively, passengers may not have to walk to get on or get off the bus, instead, the entire seat may be move automatically in and out the autonomous car 100, for example, through a robot or certain tools and techniques and or special hooks built to elevate the seat in and off of the autonomous car 100, and or on and off the bus 200, train, ship or airplane. The system may replace the passenger seat with an empty one in the autonomous car 100 and or in the bus 200, for example when the passenger remains in his seat and a replacement seat is needed to fill the unoccupied seat.

As mentioned above, the method herein regarding passengers getting on and off the bus, may be identical or may be represented with by the same and/or different methods, for example, by train, ship and airplane, in accordance with embodiments of the present invention. The method, for example, may not include the attachment between an autonomous car and an airplane while it on the move, unless the autonomous car is an autonomous airplane, which in such case may also attach and detach to a ship and or a train while moving. For example, the autonomous car may enter the airport or port or train station, pick up or drop off the passenger, whether directly, or for example, by robots or certain tools and techniques and or special hooks built to elevate the autonomous car 100 completely or partially. For example, the Passenger compartment 120 is as described with reference to FIG. 3 or by elevating the seat.

Figure 6:
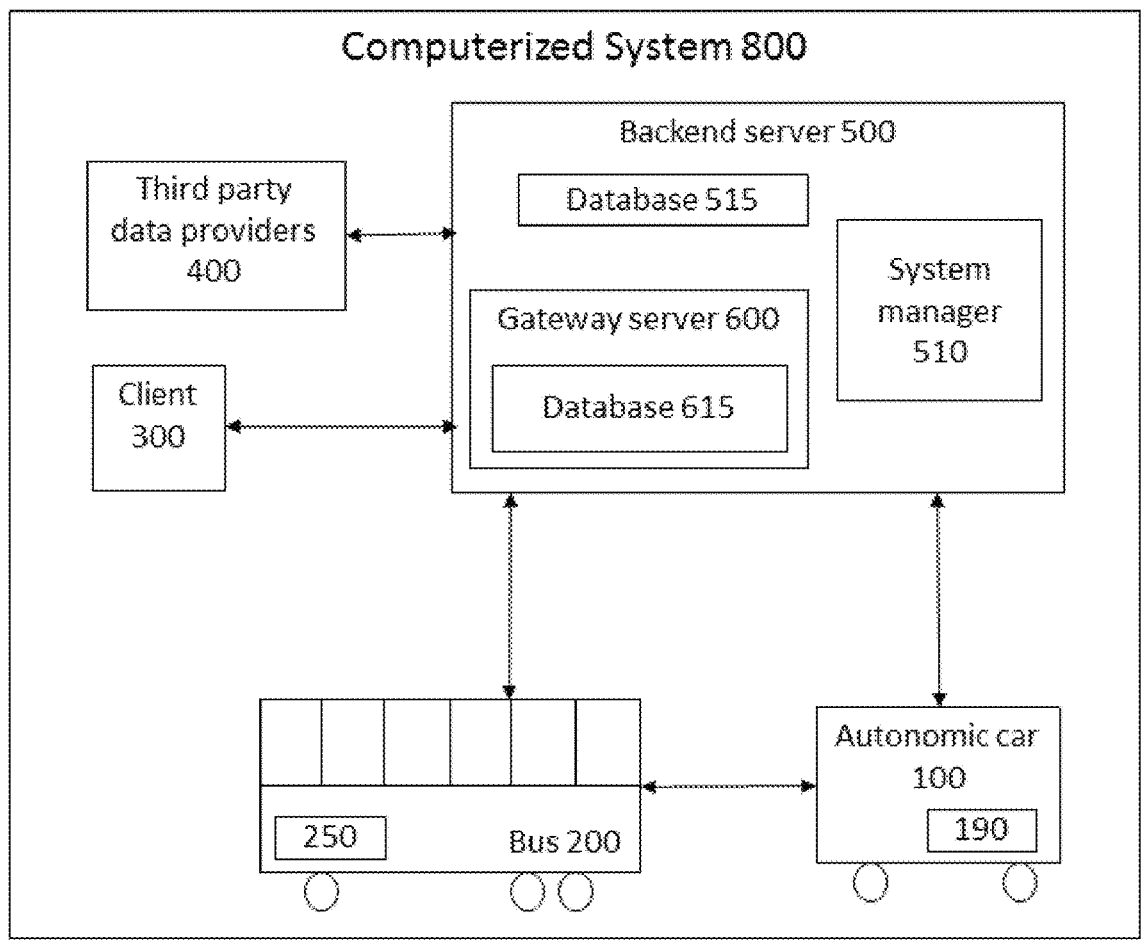
FIG. 6 is a schematic block illustration of a Computerized system for the autonomous public transportation system according to some embodiments of the present invention.

Reference is now made to FIG. 6, which is a schematic block illustration of a computerized system 800 for an autonomous public transportation system according to some embodiments of the present invention. System 800 may include a computerized system 190, a computerized system 250, links to third party data providers 400, a client application 300 and a backend server 500.

Computerized system 190 and computerized system 250 are described in detail below. Third party data providers 400 include any service provider who may provide useful data or information such as traffic, accident, events that may cause traffic and or road blocks, maps for better navigation, and the like.

A client application 300 may be a native mobile application a web application and or any suitable application that provides an interface with a passenger who may desire to use the autonomous public transportation. This includes ordering a ride, receiving notifications regarding any delay and or updates regarding the autonomous car 100 location, time of the pick-up, and or an alert for get off the bus 200 when the corresponding autonomous car 100 is attached to the bus and ready to take the passenger to his destination or to another bus.

A backend server 500 may include a database 515, a Gateway server 600, and a system manager 510. Additionally, the gateway server 600 may farther include a database 615 which may be used to save and load data needed for a specific purpose according to some embedment of the present invention. Gateway server 600 may access database 515 directly or indirectly, for example, through system manager 510, database 515 may act as additional or alternative database to database 615. Additionally, gateway server 600 may allocate suitable communication channels and serve as bridge and/or intermediate. Additionally, gateway server 600 may establish connections between servers and/or autonomous car (s) 100 and/or buses and/or trains and/or ships and/or airplanes. Gateway server 600 may provide service by using databases, for example, information about traffic, accidents, passengers who need a ride, and other suitable data according to some embodiments of the present invention. Gateway server 600 may help establish a peer to peer connection between autonomous cars 100 and busses 200, and or between any other peers.

The backend server 500 may include a database 515, which may be used for storing data for making connections between an autonomous car 100 and bus 200, and or between a passenger through the client application 300 and the autonomous car 100, and the autonomous car 100 and bus 200. Data may include identification information about each autonomous car 100, bus 200 and or any other peer connected to the system such as ships, trains and airplanes. Additionally, the data may include relations and/or connections between passengers, autonomous car 100 and target bus or location, to enable an accurate movement of the passengers from and to locations and or a bus/train/ship and airplane. Additionally, database 515 may include additional data for analyzing and processing the status and/or the information received from the third party providers 400 and or the data gathered from autonomous cars, busses/public vehicles and or clients 300 to provide better and accurate services and or decisions for the successfully accomplish the system and methods of the autonomous public transportation system. For example, such data may include information pertaining to whether a bus has to change the path or stay on the same one, and or which autonomous car shall attached to which bus, and/or when and or where to pick which passenger and take him to his destination.

In some embodiments, client application 300 and or computerized system 190 and or computerized system 250 may receive data from database 515 and or database 615, whether directly, or through the gateway server 600 and/or system manager 510. In certain embodiments, data is pushed by the gateway server 600 and/or the system manager 510, to the client application 300 and/or the computerized system 190 and/or the computerized system 250. For example, this provides information to the bus 200 to avoid an accident and/or traffic by changing the route.

Additionally, the gateway server 600 may allocate suitable communication channels and serve as a bridge and/or intermediary between a client application 300 and/or autonomous car 100, for example, to receive updates regarding its location and/or time to reach the passenger location and or the destination. Gateway server 600 accesses a database that includes information about the location of a bus to enable an autonomous car to pass or pick up the passenger to or from a corresponding bus, at the optimal, easiest and safest location and or time. Additionally, gateway server 600 may establish connections between busses 200 and autonomous cars 100, where a bus 200 may directly, or through a gateway server 600 inform about its location, speed, status etc.

Additionally, backend server 500 may include a system manager 510, which may provide services to help the performance of the entire system, such as monitoring the bus location, autonomous car locations, which autonomous car to pick which passenger and to which bus to take the passenger.

Figure 7:
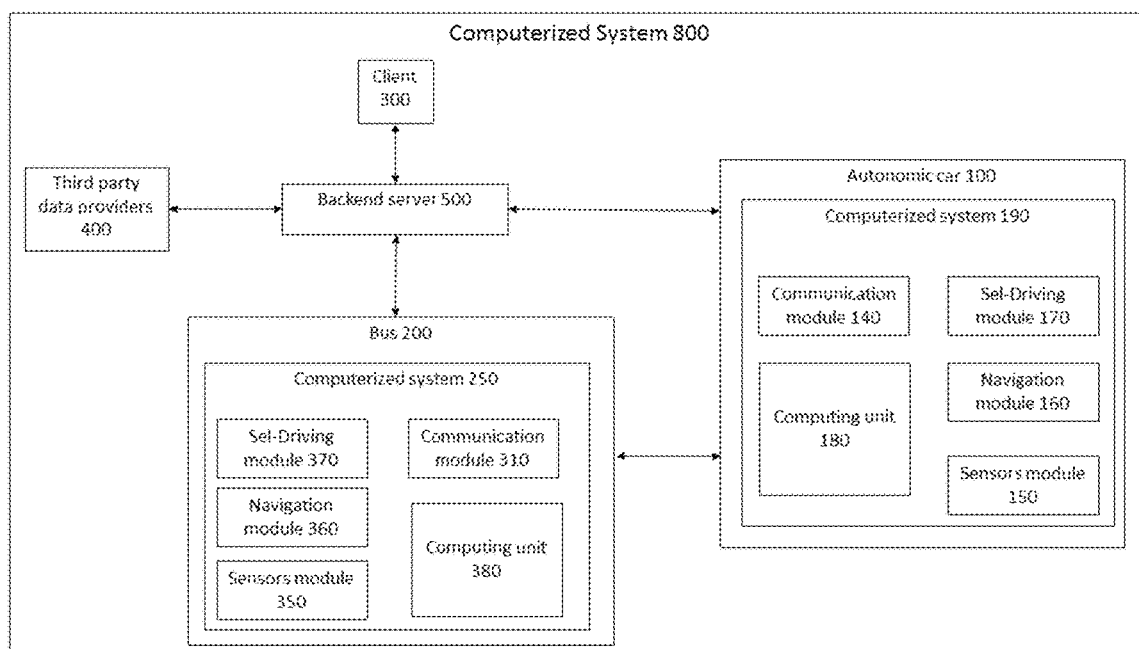
FIG. 7 is a schematic block illustration of a computerized system for the autonomous public transportation system according to some embodiments of the present invention.

Reference is now made to FIG. 7, which is a schematic block illustration of a computerized system 800 for an autonomous public transportation system. System 800 may include a computerized system 190, a computerized system 250, a third party data provider 400, a client application 300 and a backend server 500, all in accordance with that as detailed above.

Computerized system 190 may include communication module 140, self-driving module 170, navigation module 160, sensors module 150 and computing unit 180. Self-driving module 170 may manage the driving, such as that with the Google® self-driving car project. The computerized system 190 may navigate the autonomous car 100 to a passenger location using the self-driving module 170, which may use navigation module 160 that provides the navigation system. Additionally, the self-driving module 170 may use the sensor module 150, which may provide a set of tools and/or sensors to sense the inside and outside of the autonomous car environment. Sensors may include a speedometer, a set of temperatures sensors, camera, Gyroscope, GPS, etc. The computing unit 180 may act as the manager of the computerized system 190. The computerized manager system 190 may determine the path (route), and may change the path for example by commanding the self-driving car to take a different route, for example, based on information about traffic. Additionally it may inform the backend about its location, direction and status directly or through communication module 140. Additionally, the computerized system 190 may communicate using the communication module 140 with the bus 200, directly or through gateway 600. Additionally, the computing unit 180 may determine the speed and/or it may control the self-driving module 170, for example, to enter into the attach mode with the bus 200. Additionally, the computing unit 180 may control and manage the loading and unloading of passengers, for example, by safely attaching or locking the safety attachment mechanism with the bus 200 to avoid any risk of detaching during the passenger getting off and getting on the bus 200. The computing unit 180 may open the loading door, may control the temperature and may communicate with the other peers (such as, other autonomous cars, busses, trains, ships, airplanes and client 300) and/or backend server 500 for gathering, exchanging and requesting information. Computing unit 180 may detect dangers situations outside and inside the autonomous car such as violence or passengers medical and other conditions, for example, via sensors provided by the sensors module 150, and issue alerts.

Computing unit 180 may communicate with the client 300, for example, to receive the exact location of the passenger and/or update the passenger with the autonomous car location, distance from the passenger and the arrival time to the passenger, using, for example, communication module 140 directly and/or through backend server 500.

Communication module 140 may transfer data and/or manage communications between the computerized system 190 and/or its modules, backend server 500, gateway 600, the computerized system 250 and/or its modules, for example, communication module 310, directly or through backend 500 and client application 300.

Computerized system 250 may include communication module 310, self-driving module 370, navigation module 360, sensors module 350 and computing unit 380. Self-driving module 370 may manage the bus being fully self-driving and/or partly-self-driving, including the ability to enter the attaching or detaching mode with an autonomous car 100. Computerized system 250 may navigate a bus 200 to a predetermine destination but may change the route to the predetermined destination according to traffic. Modules 310, 350, 360, 370, are similar to corresponding modules 140, 150, 160 and 170, and are in accordance with the descriptions of these modules above.

Computerized system 250 may use the self-driving module 370 which may use the sensor module 350 which may provide set of tools and/or sensors to sense the inside and outside of the bus environment. Sensors may include a speedometer, a set of temperature sensors, camera, Gyroscope, GPS, empty/occupied seats etc., for example, to drive/navigate the bus 200 to its destination and for navigating the bus during the attaching and detaching processes with the autonomous car 100. Computing unit 380 may act as the manager of the computerized system 250. The computing manager 380 may determine the route, and may change the route for example by commanding the driver or the self-driving car to drive on a different route, for example, based on information about traffic. Additionally it may inform the backend server 500 about its location, direction and status, such as occupied and empty seats directly or through communication module 310.

Computerized system 800 may know in any certain time, which autonomous car drives to and from which location, the list of the autonomous cars waiting to attached to a certain bus, to load and or unload passengers, which autonomous car is in the attaching or detaching process, and which autonomous cars are being rerouted to alternative destinations, for example, when the bus is full.

Computerized system 250 may communicate using the communication module 310 with the autonomous car(s) 100 that are attached and/or are in the attaching/detaching process and or waiting to its turn to attach the bus, directly or through gateway 600. Additionally computing unit 380 may determine the speed and or, additionally it may control the self-driving module 370 for example to turn into and from the attaching mode with the autonomous car 100. The computing unit 380 may control and manage the loading and unloading of the passengers, for example, by safely attach or lock the safety attachment mechanism with the autonomous car 100 to avoid any risk from detaching during the passenger get off and get on the bus. Additional, computing unit 380 may open the loading door in the attached zone 101 and/or the autonomous car 100 loading door 103, and it may communicate with the other pees (such as, other autonomous cars, busses, trains, ships, airplanes and client 300) and/or backend server 500 for gathering, exchanging and requesting information and data. Computing unit 380 may detect dangers situations outside and inside the bus such as violence, a passenger medical and other condition, using, for example, sensors provided by the sensors module 350 and may issue alerts.

Computing unit 380 may communicate with the client 300, for example to inform the passenger to be ready or to leave the bus when the autonomous car 100, for example, ready to take him to its destination, through, for example, communication module 310, directly and/or through the backend server 500.

Additionally, a passenger may get on and off the bus directly without the need for an autonomous car as it done today, for example, when the bus passes near the passenger's location or destination, which does not require using an autonomous car, unless a bus cannot stop and has to load and unload passengers while on the go.

Communication module 310 may transfer data and/or manage communication between computerized system 250 and/or its modules, backend server 500, gateway 600, computerized system 190 and/or its modules, for example, communication module 140, directly or through backend 500, and client application 300.

Figure 8:
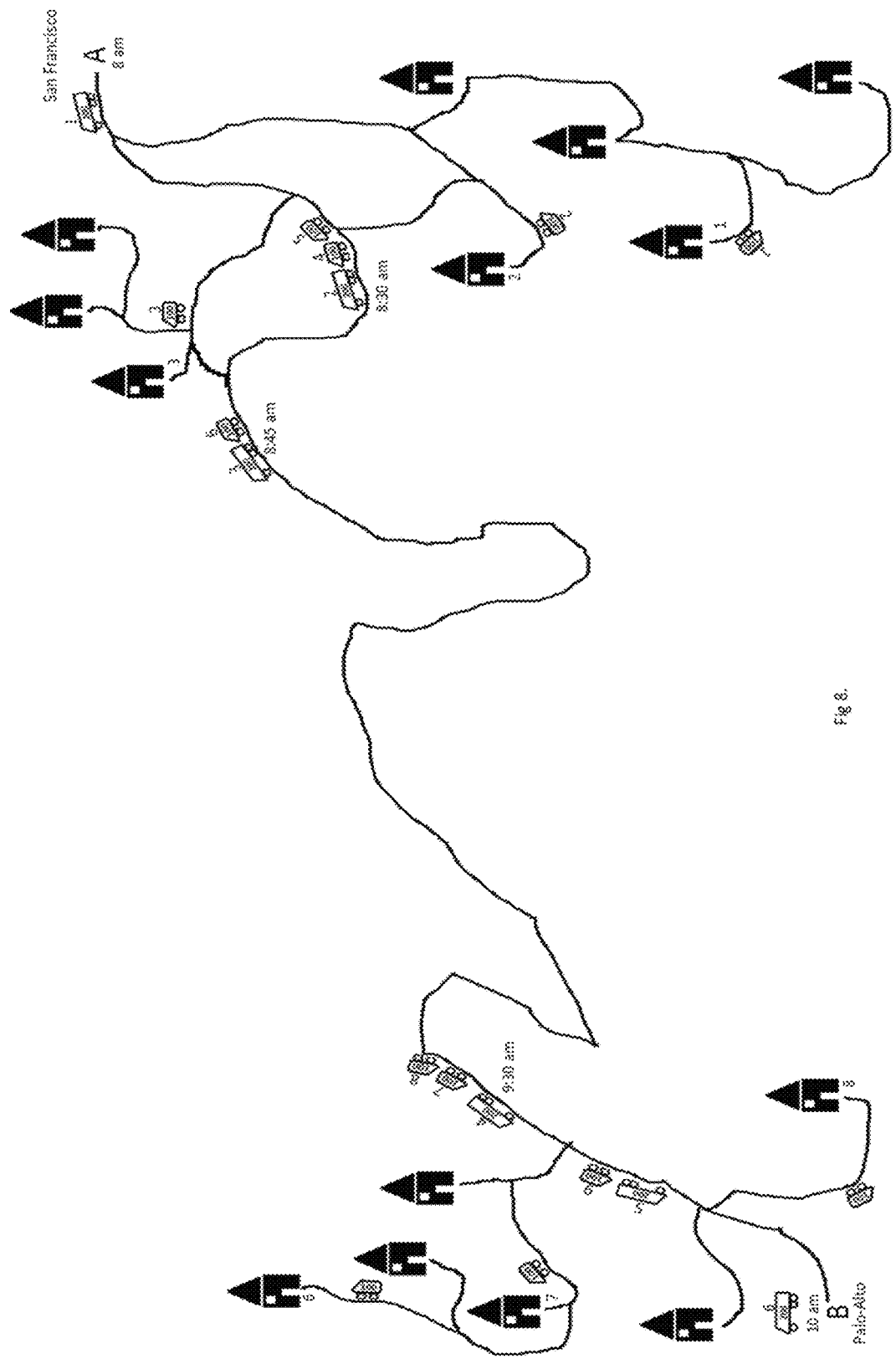
FIG. 8 is a schematic illustration the big picture that show the system in action during the bus movement on his path from point A to destination point B, while the autonomous cars transfer passengers from their locations to a bus and back from a bus to their destinations according to some embodiments of the present invention.

Reference is now made to FIG. 8, which is a schematic illustration of an example system operation. A bus 200 leaves point A (San Francisco) at 8 am to its destination at point B (Palo Alto), and is estimated to arrive at 10 am. Prior the bus leaving point A, passengers 1 and 2 order a ride to destinations 6 and 7 at point B. After a few minutes while bus 200 at location 1 (200/1), autonomous car 100/1 and 100/2 went to pick up passengers 1 and 2 from their homes respectively. These passengers were notified in advance about the time when the automatic car 100 may arrive. At 8:30 am bus 200 reaches location 200/2, while immediately behind it, autonomous cars 100/4 and 100/5 requesting to put passengers 1 and 2 on the bus 200. Autonomous car 100/4 attached first to bus 200, passenger 1 get on the bus. The autonomous car 100/4 is detached and moves away from the bus 200. Autonomous car 100/5 then attaches and let passenger 2 get on the bus 200, then detaches and moves away from the bus 200. Additionally, passengers may get on the bus while the bus is moving. Alternatively, the bus 200 may have to stop and/or the bus may be in both modes, stopping or moving modes. Additionally or alternatively, autonomous car may pick a passenger from the bus after the passenger that was in the autonomous car, get on the bus.

While bus 200 at location 2 (200/2), passenger 3 orders a ride to destination 8 in point B. Autonomous car 100/3 picks up passenger 3 after, for example, 5 minutes, and attaches to the bus 200 at location 3 (200/3, at 8:40). The passenger gets on the bus, and the autonomous car 100 then detaches and moves away the bus.

When bus reaches to location 4 at point B, autonomous cars 100/7 and 100/8 are ready to attach the bus to pick up passengers 1 and 2 from the bus and take them to their destinations 6 and 7. Passengers may receive a notification on their mobile phone (client 300) and or by voice alert and or any other alternative to let the passengers know when it's the correct time to get off the bus. Autonomous car 100/7 and 100/8 may take the passengers to their destination. When the bus 200 reach to location 5 (200/5), autonomous car 100/9 is ready to attach the bus 200/5 to take passenger 3 to his destination 8.

As described above, autonomous car 100 may transfer a passenger from one bus to another bus.

Additionally or alternatively, autonomous car may transfer a passenger directly or from a bus to a train, ship and airplane directly any or by other way such as by detached the passenger seat by an elevator who may transfer the passenger to the corresponding location and or seat on the train, ship or airplane. Further, the system my include a modules/tools/systems for attaching/detaching a car to a modules/tools/systems that may able to transfer the passenger to train, ship or airplane, such as a robot/system that elevate the entire seat of the passenger, the passenger compartment 120, and move it to the corresponding seat or location on the ship/train or airplane. Additionally the system may include a tool to elevate passenger items such as luggage.

Figure 9:
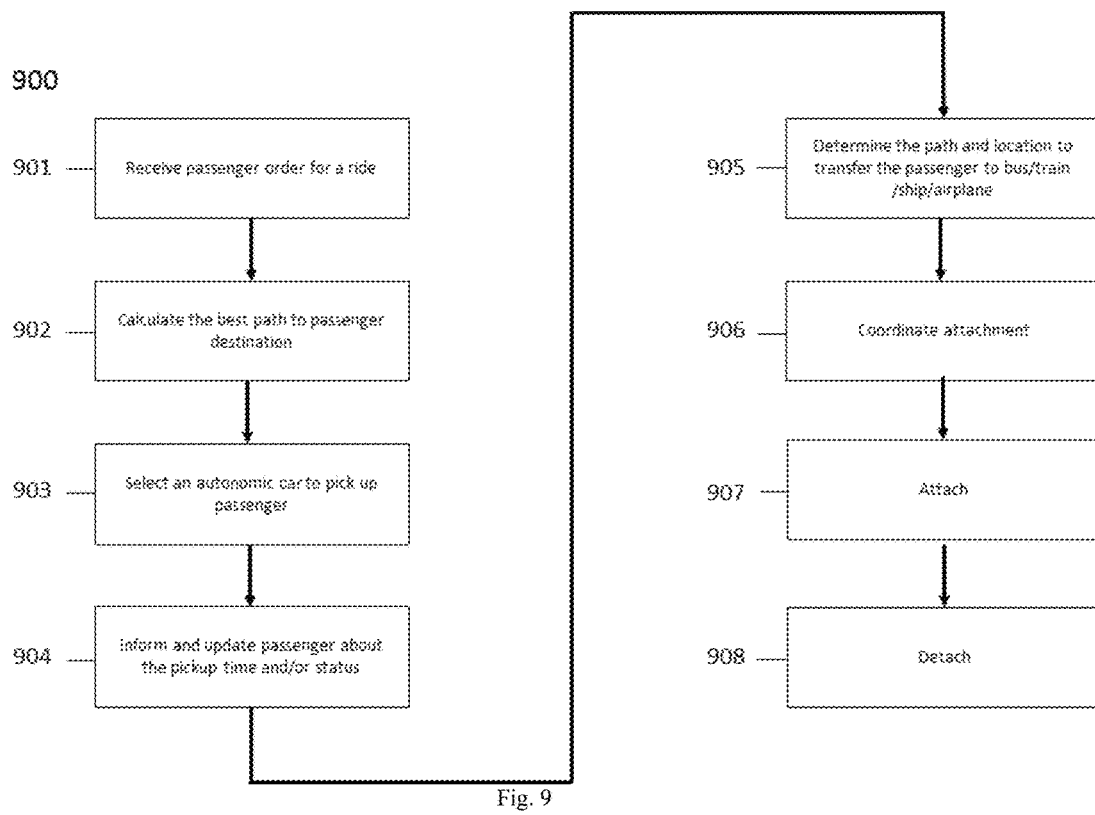
FIG. 9 is a flowchart illustrating a method for passenger who want to go from his home to his work (order a ride) according to embodiments of the present invention.

Reference is now made to FIG. 9, which is a flowchart illustrating a method 900 according to certain embodiments of the invention. This method is performed, for example, in real time, and typically automatically. As indicated in step 901, the method may include the system receiving an order for a ride by a passenger, for example, through client 300. The order may include passenger location, destination and any suitable information. As indicated in step 902, the method may include calculating the optimum path from a passenger location to the desired destination. As indicated in step 903, the method may include selecting a corresponding autonomous car to pick up a passenger. As indicated in step 904, the method may include informing and updating the passenger regarding the pickup time, the status of the autonomous car, its destination from the passenger and any other suitable and useful information. As indicated in step 905, the method may include determining the autonomous car path to a bus/train/ship/airplane to transfer the passenger to get to his desired distention, the path may be updated for example if the bus change its path. As indicated in step 906, the method may include coordinating an attaching for example to a bus. As indicated in step 907, the method may include attaching process of an autonomous car to a bus/train/ship/airplane. As indicated in step 908, the method may include detaching an autonomous car from a bus/train/ship/airplane.

Figure 10:
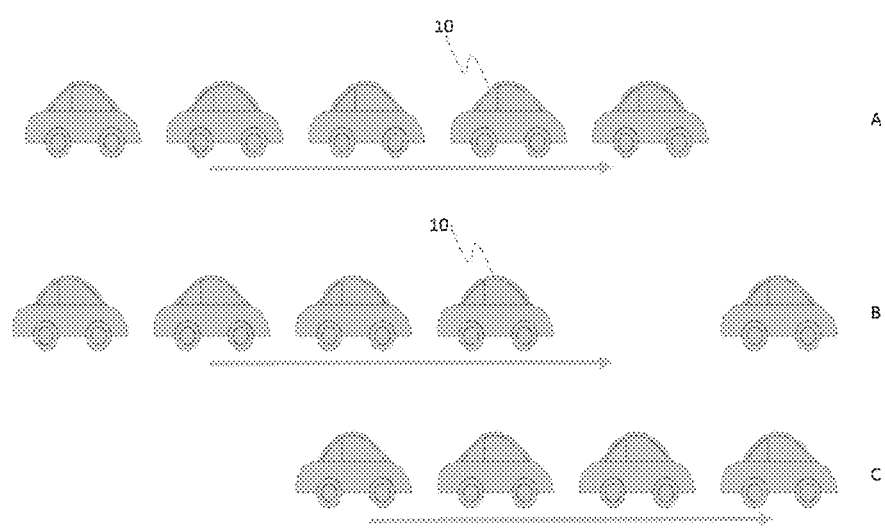
FIG. 10 is a schematic illustration join few autonomous cars into one group according to embodiments of the present invention.

Reference is now made to FIG. 10, which is a schematic illustration of joining multiple autonomous cars or vehicles, as well as electric cars or vehicles, such as driven electric cars, which include a system mode to enable connection to and/or joining other cars. The aforementioned cars are, for example, are traveling in the same direction on the road, into one group. The method provides the ability to manage and control one and/or many autonomous cars, for example. The system may determine that some of the cars should be combined together, into a single vehicle, for example, when some autonomous cars travel in the same direction on the same road. The system may determine that all of these autonomous cars will drive at the same speed, in proximity to each other, at a known or predetermined distance from one to other (train alike) as illustrated in FIG. 10A, with or without a connector member between the cars. This, for example, enables the group of autonomous cars priority during the ride, for example, to drive in the carpool lane (HOV), or other special lanes. Additionally, if one autonomous car has to leave the HOV lane (for example, car 10), and to leave the group structure, autonomous car 10 may reduce its speed to let the other cars ahead to move forward then to leave the group as illustrated in FIG. 10B. After the autonomous car 10 has left the group structure, the other cars, which were behind car 10, may speed up and/or the ones which were ahead car 10 may slow down, to return back the group structure, as illustrated in FIG. 10C.

Alternately, the autonomous cars may connect to each other, or be within a predetermined distance from each other, in order to combine energy resources, and reduce wind drag. Additionally, the autonomous cars can combine energy resources, for example, with at least two cars, if one car has a high battery charge, and the other car has a low battery charge, the car with the high battery charge provides charge to the car needing the battery charge, allowing it to continue driving.

In some embodiments of the present invention cars may communicate with each other, for example, through the backend server 500. This may, for example, include taking a picture and/or analyze the car license plate (license) number or other identifying marks on the car, and request from backend server 500 to establish communication with each other. Additionally, the cars may include a module that enables them to communicate with each other directly or through backend 500 with and or without the need to know each other's specific identification, for example, license number, or their location, obtained, for example, by GPS (Global Positioning System) and or Gyroscope.

In some embodiments of the present invention, cars may include an ability to charge each other, for example, via a connector in front and or back of the car, which enables cars to connect to each other and exchange and or share battery charge (energy) or charge the weaker battery.

Additionally or alternatively cars may include a connector that enables them to engage or otherwise lock themselves, for example, like train cars, which may force the car to stay on one line and or push or pull each other's and or control the wheels of each other's for example by the first car (the group leader). In some embedment of the present invention, the connector may be automatically controlled to be locked and released accordingly.

The methods and systems, including components thereof, herein have been described with exemplary reference to specific hardware and software. The methods have been described as exemplary, whereby specific steps (procedures) and their order can be omitted and/or changed by persons of ordinary skill in the art to reduce these embodiments to practice without undue experimentation. The methods and systems have been described in a manner sufficient to enable persons of ordinary skill in the art to readily adapt other hardware and software as may be needed to reduce any of the embodiments to practice without undue experimentation and using conventional techniques.

While certain embodiments of the disclosed subject matter have been described, so as to enable one of skill in the art to practice the present invention, the preceding description is intended to be exemplary only. It should not be used to limit the scope of the disclosed subject matter, which should be determined by reference to the following claims.

The invention claimed is:

1. A method for transport comprising:
providing a single vehicle including a primary vehicle and a secondary vehicle separable from the primary vehicle;
separating the secondary vehicle from the primary vehicle, allowing the secondary vehicle to travel along a route different from the route of the primary vehicle to pick up or drop off passengers; and,
the secondary vehicle rejoining the primary vehicle as the single vehicle, for loading and unloading passengers to and from the primary vehicle, while the single vehicle travels along the route of the primary vehicle.

2. The method of claim 1, wherein the secondary vehicle includes an autonomous bus station which allows passengers to get on and get off the autonomous bus station.

3. The method of claim 1, wherein the primary vehicle changes routes, to accommodate changes in road conditions.

4. The method of claim 1, wherein the primary vehicle includes a vehicle, controlled by at least one of: a driver, semi-automatically, or autonomously.

5. The method of claim 1, wherein the secondary vehicle includes a vehicle, controlled by at least one of: a driver, semi-automatically, or autonomously.

6. The method of claim 1, wherein the loading and unloading of passengers is performed by a seat which automatically moves between the primary and secondary vehicles.

7. The method of claim 1, wherein the secondary vehicle moves passengers between two or more primary vehicles.

8. The method of claim 1, additionally comprising: coordinating communication between the primary vehicle and the secondary vehicle, and passenger, such that a time and location of a secondary vehicle to attach to a primary vehicle to load and or unload a passenger is determined.

9. The method of claim 1, wherein the attaching and detaching between the primary vehicle and the secondary vehicle is performed automatically.

* * * * *